(12) United States Patent
Chen et al.

(10) Patent No.: US 9,916,062 B2
(45) Date of Patent: Mar. 13, 2018

(54) METHOD, ELECTRONIC DEVICE, AND COMPUTER-READABLE RECORDING MEDIUM FOR PRESENTING APPLICATION LISTS

(75) Inventors: Li-Hsuan Chen, New Taipei (TW); Po-Hsu Chen, New Taipei (TW); Fang-Wen Kuo, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 13/620,789

(22) Filed: Sep. 15, 2012

(65) Prior Publication Data

US 2013/0290886 A1 Oct. 31, 2013

(30) Foreign Application Priority Data

Apr. 25, 2012 (TW) .............................. 101114689 A

(51) Int. Cl.
*G06F 3/048* (2013.01)
*G06F 3/0482* (2013.01)
(Continued)

(52) U.S. Cl.
CPC ........ *G06F 3/0482* (2013.01); *G06F 3/04886* (2013.01); *H04N 5/44543* (2013.01)

(58) Field of Classification Search
CPC .. G06F 3/0482; G06F 3/04817; G06F 3/0481; G06F 3/04886; H04N 5/44543
(Continued)

(56) References Cited

U.S. PATENT DOCUMENTS 7,340,686 B2 * 3/2008 Matthews et al. ............ 715/779
2007/0271532 A1 11/2007 Nguyen et al.
(Continued)

FOREIGN PATENT DOCUMENTS

CN 101211250 A 7/2008
CN 101924892 A 12/2010
(Continued)

OTHER PUBLICATIONS

Nathan Lineback, "Windows 3.1 Screen Shots," Jan. 1, 2010, Toasty Technology, available at https://web.archive.org/web/20100101045518/http://toastytech.com/guis/win31.html.*
(Continued)

*Primary Examiner* — Andrew T Chiusano
(74) *Attorney, Agent, or Firm* — Li & Cai Intellectual Property (USA) Office

(57) ABSTRACT

A method for presenting application list is disclosed, which is applied to an electronic device. The method includes activating a list arrangement program which reads several applications and generates categorized application list accordingly. Each application is associated with one of the categories, and includes objects representing the application. The categorized application list includes several groups, each of them includes a category name of one category and the objects associating with one or more applications under the category. The method further includes receiving the control command for displaying one of the groups at the index region of the user interface of the electronic device. The index region is arranged at the side of the user interface. Thus, an application list which is categorized may be provided for improving the convenience of accessing applications.

14 Claims, 12 Drawing Sheets

(51) Int. Cl.
*H04N 5/445* (2011.01)
*G06F 3/0488* (2013.01)

(58) Field of Classification Search
USPC .................................. 715/768, 828; 725/61
See application file for complete search history.

(56) References Cited

U.S. PATENT DOCUMENTS

| | | | |
|---|---|---|---|
| 2008/0033876 A1* | 2/2008 | Goldman | G06Q 20/108 |
| | | | 705/42 |
| 2009/0267909 A1 | 10/2009 | Chen et al. | |
| 2009/0271703 A1 | 10/2009 | Chu et al. | |
| 2009/0271731 A1 | 10/2009 | Lin et al. | |
| 2009/0271783 A1 | 10/2009 | Hsieh et al. | |
| 2009/0288032 A1 | 11/2009 | Chang et al. | |
| 2010/0169813 A1* | 7/2010 | Chang | G06F 3/0488 |
| | | | 715/767 |
| 2010/0199306 A1 | 8/2010 | Colter et al. | |
| 2010/0254525 A1* | 10/2010 | Maly et al. | 379/207.03 |
| 2010/0281374 A1* | 11/2010 | Schulz et al. | 715/723 |
| 2010/0318908 A1 | 12/2010 | Neuman et al. | |
| 2011/0035500 A1 | 2/2011 | Yang | |
| 2012/0019721 A1* | 1/2012 | Choi | H04N 5/4403 |
| | | | 348/564 |
| 2012/0023524 A1* | 1/2012 | Suk et al. | 725/43 |
| 2012/0030558 A1 | 2/2012 | Chiu et al. | |
| 2012/0174007 A1* | 7/2012 | Lee et al. | 715/765 |
| 2012/0185456 A1* | 7/2012 | Hart et al. | 707/706 |
| 2012/0204131 A1* | 8/2012 | Hoang et al. | 715/835 |
| 2012/0297330 A1* | 11/2012 | Meyers et al. | 715/772 |
| 2012/0304074 A1* | 11/2012 | Ooi et al. | 715/752 |
| 2012/0304229 A1* | 11/2012 | Choi | H04N 21/8173 |
| | | | 725/41 |
| 2013/0071822 A1* | 3/2013 | Humphreys | 434/236 |

FOREIGN PATENT DOCUMENTS

| | | |
|---|---|---|
| CN | 102156750 A | 8/2011 |
| TW | 201044254 A1 | 12/2010 |
| TW | 201106639 A1 | 2/2011 |

OTHER PUBLICATIONS

Jeonkwan, iBentu, "New understanding KDE4.x—second bomb: KDE does not need to use a good toss crazy configuration: Plasma Profile", Aug. 1, 2010, http://www.ibentu.org/2010/08/01/get-to-know-kde-2-plasma.html.
Taiwan Patent Office, Office action dated May 20, 2014.
Jeff Sharkey, "GroupHome: organize your Android apps into groups", http://jsharkey.org/blog/2008/12/15/grouphome-organize-your-android-apps-into-groups, Dec. 15, 2008.
Taiwan Patent Office, Office action dated Sep. 5, 2014.
Taiwan Patent Office, Office action dated Oct. 22, 2014.
China Patent Office, Office action dated Nov. 3, 2015.
China Patent Office, Office action dated Nov. 17, 2016.
iBentu, "A New Understanding of KDE 4.x", Aug. 2, 2010, www.linuxeden.com/html/softuse/20100802/104089.html.

* cited by examiner

METHOD, ELECTRONIC DEVICE, AND COMPUTER-READABLE RECORDING MEDIUM FOR PRESENTING APPLICATION LISTS

BACKGROUND OF THE DISCLOSURE

1. Field of the Invention

The present disclosure relates to a method for presenting lists and an electronic device thereof; in particular, to a method for presenting application lists and an electronic device thereof.

2. Description of Related Art

According to the diffusion of the smart electronic devices, the applications developed for the smart electronic devices are more and more in number and type. The application may be priced or free for users to download from the Internet.

When the electronic device stores several applications, the efficiency of finding the requisite applications depends on the display manner of the applications at the electronic device. The common arrangement manner of the applications includes layering display and all-display with no layers. The layering display manner may let the user find the needed applications in order, however, too many layers may make the user be confused about what layer the application belongs to, and too many operations may increase the finding time. Although the all-display manner is good for the user to explore all of the applications once at a time, the user may be hard to find the requisite applications quickly, and the display region of the user interface may be greatly occupied by the numerous applications, which influences the convenience of seeing the data originally displayed at the user interface.

SUMMARY OF THE INVENTION

The embodiment of the present disclosure provides a method for presenting application lists which is associated with an electronic device. The method includes activating a list arrangement program, and reading several applications according to the list arrangement program and generating a categorized application list. Each application is associated with one of several categories, and includes an object representing the application. The categorized application list includes several groups. Each group has a category name of one category and several objects of one or more applications which are associated with the category. After that, the method receives a control command for displaying one of the groups at an index region of a user interface of the electronic device. The index region is disposed at the side of the user interface.

In addition, a computer-readable recording medium which records a set of computer executable program is also disclosed. When the computer-readable recording medium is read by a processor, the processor executes the steps of the described method.

Besides, the embodiment of the present disclosure also discloses an electronic device which has the corresponding components for executing the aforementioned method.

On the basis of the above, the method, electronic device, and computer-readable recording medium for presenting application lists according to the present disclosure may provide classified application list, and the list may be displayed or hidden according to the needs of the user, which achieves the efficacies of improving convenience of finding applications and space usage of the user interface.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows.

DETAILED DESCRIPTION OF THE PREFERRED EMBODIMENTS

Device Embodiment

Figure 1:
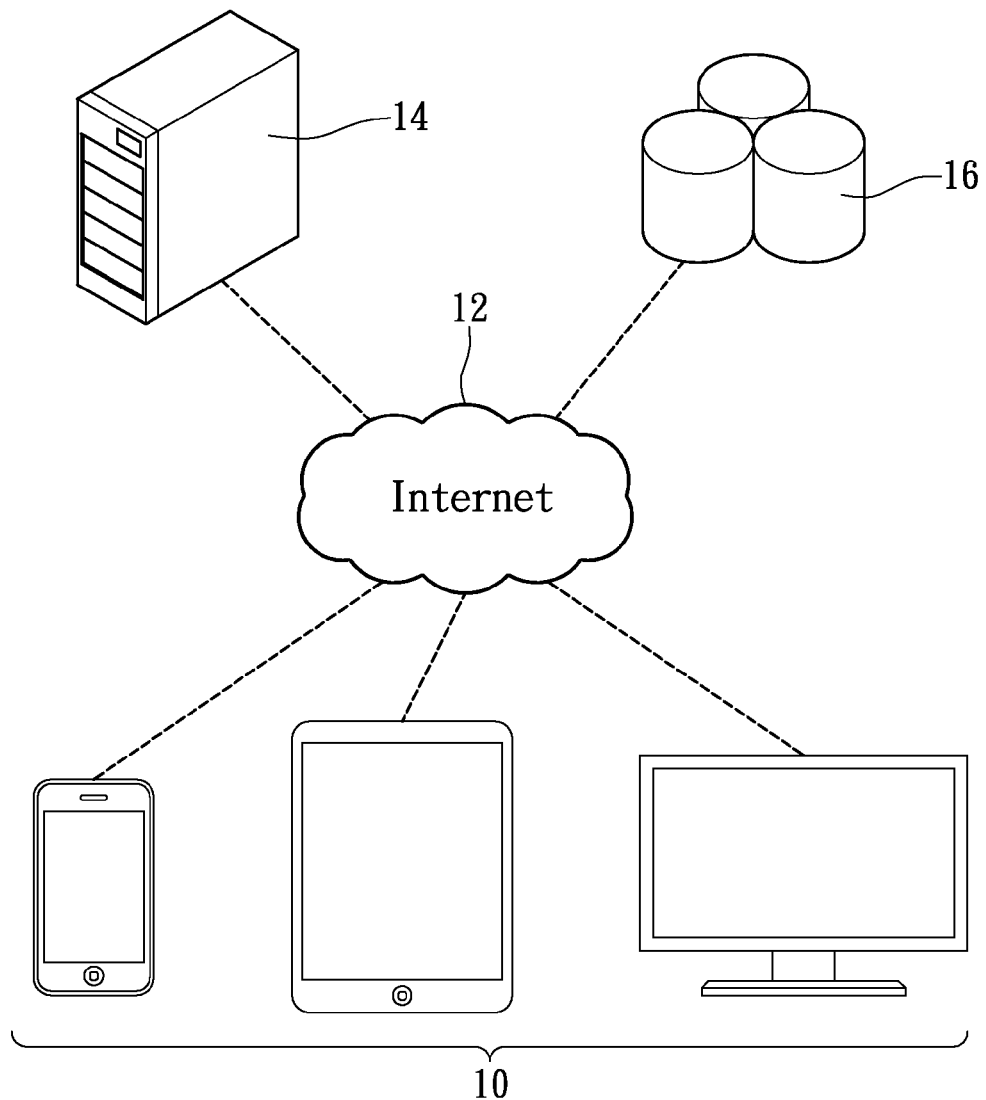
FIG. 1 shows an environment structure diagram of an electronic device for presenting application list according to the present disclosure.

Please refer to FIG. 1 which shows an environment structure diagram of an electronic device using the Internet for accessing applications. The electronic device 10 with internet connection capability may connect to a server 14 through the Internet 12, and downloading applications, videos, documents, or real-time refreshing information from the server 14 to the electronic device 10 after identifying the identification data (such as the ID and password) of the electronic device 10 by the identification database 16. The electronic device 10 may be a smart phone or tablet computer with wireless web surfing capability, or a digital television with network communication module, etc. The server 14 may be one or more computers or workstations, for storing several kinds of digital data or contents provided by numerous providers.

Because the electronic device 10 may get all kinds of data by using the environment structure shown in FIG. 1, it may store a great number of applications, such as games, video players, image editing programs, etc. Thus the present disclosure provides an embodiment of the electronic device, for making it be able to simply and systematically provide the surfing interface of the applications, to let the user to check or find the applications stored in the electronic device 10.

Figure 2:
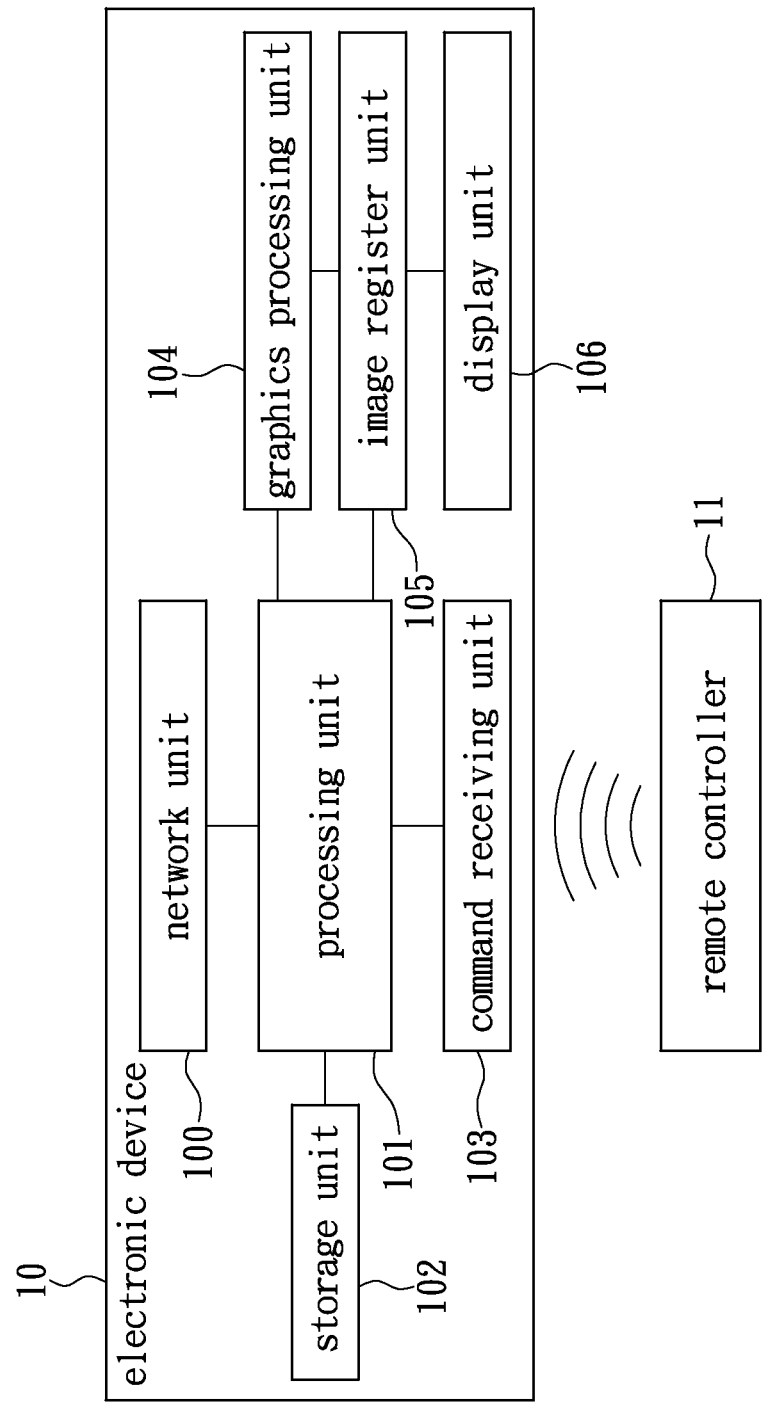
FIG. 2 shows a block diagram of an electronic device according to an embodiment of the present disclosure.

Please refer to FIG. 2 which shows a block diagram of an electronic device. The electronic device 10 has a network unit 100, a processing unit 101, a storage unit 102, a command receiving unit 103, a graphics processing unit 104, an image register unit 105, and a display unit 106. The network unit 100, the storage unit 102, the command receiving unit 103, the graphics processing unit 104, and the image register unit 105 are respectively connected to the processing unit 101, and the image register unit 105 is further connected between the graphics processing unit 104 and the display unit 106.

The network unit 100 may be a network interface card, mobile communication module chip, or wireless network module chip, for providing the capability of transmitting data through networks to the electronic device 10.

The processing unit 101 is the main processing center of the electronic device 10, for executing all kinds of analysis, calculation, and control. Specifically, it may be a central processor, microprocessor, or embedded processor, etc.

The storage unit 102 may be a volatile memory such as a flash memory chip, read-only memory (ROM) chip, or random-access memory (RAM) chip, or a non-volatile memory chip, for storing the built-in system data and identification data of the electronic device 10 and the applications of the electronic device 10 captured from the Internet. For storing the data and programs in a long time, the storage unit 102 is recommended to be a non-volatile memory.

The command receiving unit 103 may be used for receiving the commands sent from the remote controller 11, and the commands are sent to the processing unit 101 for further processing. The command receiving unit 103 may be a consumer infrared (CIR) module for receiving the infrared signals sent by the remoter controller 11.

The graphics processing unit 104 may depict the graphic data according to the processing result of the processing unit 101, such as the video screen or the graphic screen shown at the user interface of the electronic device 10. The graphic data depicted by the graphics processing unit 104 may be temporally stored in the image register unit 105, and be sent to the display unit 106 for displaying. The image register unit 105 may be a volatile memory, and the display unit 106 may be a LCD screen with or without the touch input functions.

In this embodiment, the storage unit 102 further stores a list arrangement program. After the electronic device 10 is started, completes the basic hardware checks, and loads the operation system (OS), the processing unit 101 may read and execute the list arrangement program from the storage unit 102, and makes the applications of the electronic device 10 be associated with corresponding categories according to the category data thereof, such as entertainment, game, social contact, sports, finance and economy, often-used, or the favorite, etc. Thus the same kind of applications may be collected and corresponded to the same category, which makes the user to quickly call the application list and finds the related applications fast according to the category. The categories may be predetermined in the electronic device 10 or be created by the user, and the names and number of the categories are not limited by the above examples.

For making the processing unit 101 read and arrange the applications within different categories properly when executing the list arrangement program, the processing unit 101 may pre-categorize each application according to the program information thereof. The program information of the application may be meta data which may include the category tag pre-defined according to the purposes and characteristics of the application, and the objects, such as an icon, associating with the application when the provider creates the application. When the processing unit 101 downloads new applications to the electronic device 10 from the Internet, the processing unit 101 may read the meta data of the application for determining whether it records the category tag of the application or not right at the time when the downloaded application is stored in the storage unit 102. If the meta data of the application has the category tag and the electronic device 10 has the corresponding category, the processing unit 101 may directly categorize the application and/or the objects representing the application to the corresponding category according to the category tag. If the meta data of the application has the category tag but the electronic device 10 does not have the corresponding category, the processing unit 101 may create and store a new category into the storage unit 102 according to the category tag, and categorizes the application to the created category.

If the downloaded application has no pre-determined category tag, the processing unit 101 may categorize the application to the predetermined categories in the electronic device 10, such as "non-categorized" or "others".

By using the aforementioned categorizing manner, the storage unit 102 of the electronic device 10 may record several groups of categories, wherein each category may includes the category name and the one or more applications and the representing icons thereof which are categorized to be under the category.

Figure 3:
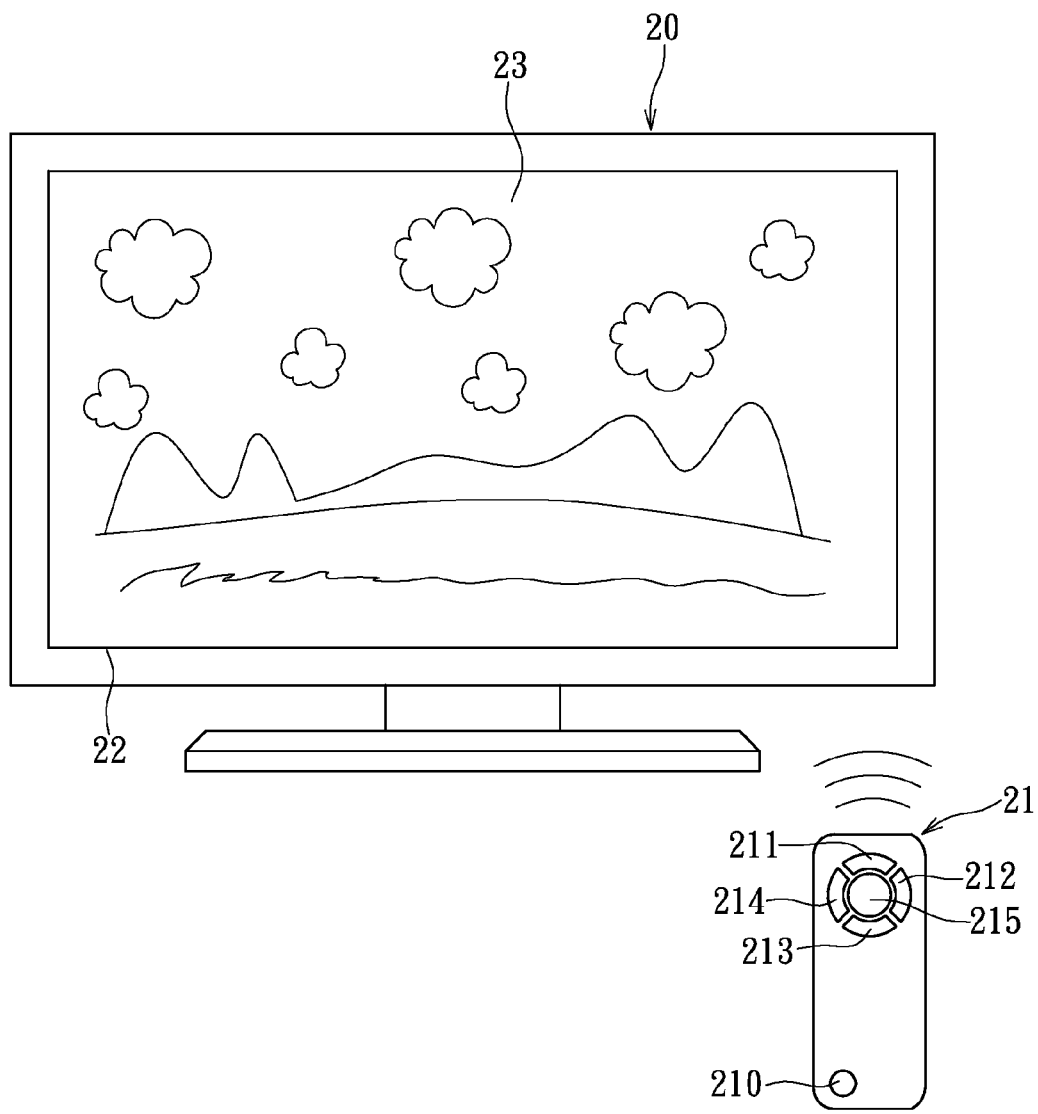
FIG. 3 shows a diagram of an electronic device which does not show an application list according to an embodiment of the present disclosure.

After the electronic device 10 categorizes the applications, the manners for allowing the user to reference, search, and select are described as follows. Please refer to FIG. 3 which is the diagram of the electronic device according to the present disclosure. The electronic device in FIG. 3 is a digital television 20 which has the capability to download applications from the Internet by the built-in network unit or outer connected set-top box (STB, not shown in FIG. 3). The user may operate the buttons of the television remote controller 21 for generating commands, and the commands are sent to the command receiving unit (not shown in FIG. 3) of the digital television wirelessly, for further control the stored applications of the digital television 20 and the display or hiding status of the applications.

The screen 22 of the digital television 20 may be used for presenting the user interface 23, and the applications and television programs of the digital television 20 may be displayed at the user interface 23. In addition to operate the direction buttons 211 to 214 of the television remote controller 21 for changing channels or volume and operate the selection button 215 for confirm the selection of a specific channel, the user may also call the stored applications of the digital television 20 by using the television remote controller 21. When the digital television 20 is turned on, the inner processing unit 101 (refer to FIG. 2) may execute the list arrangement program, for generating categorized application list displayed at the user interface 23 according to the categories stored in the storage unit 102 and the corresponding applications of each category. However, for avoiding the interference of the user for watching the images at the screen 22, before the user emits the commands for displaying the applications, the categorized application list is not displayed at the user interface 23. As shown in FIG. 3, after the digital television 20 is turned on and before the user inputs the control commands by using the television remote controller 21, the screen 22 only displays the contents of the television channels or the application screens which is shown before.

In this embodiment, the user may operate the control buttons 210 of the television remote controller 21 and generates the control commands by the controller (not shown in FIG. 3) of the television remote controller 21 according to the pressing of the control button 210, and the control commands are sent to the digital television 20. The control button 210 may be the hotkeys for controlling the display of the applications. The diagram of the digital television 20 after receiving the control commands sent from the television remote controller 21 is FIG. 4.

Figure 4:
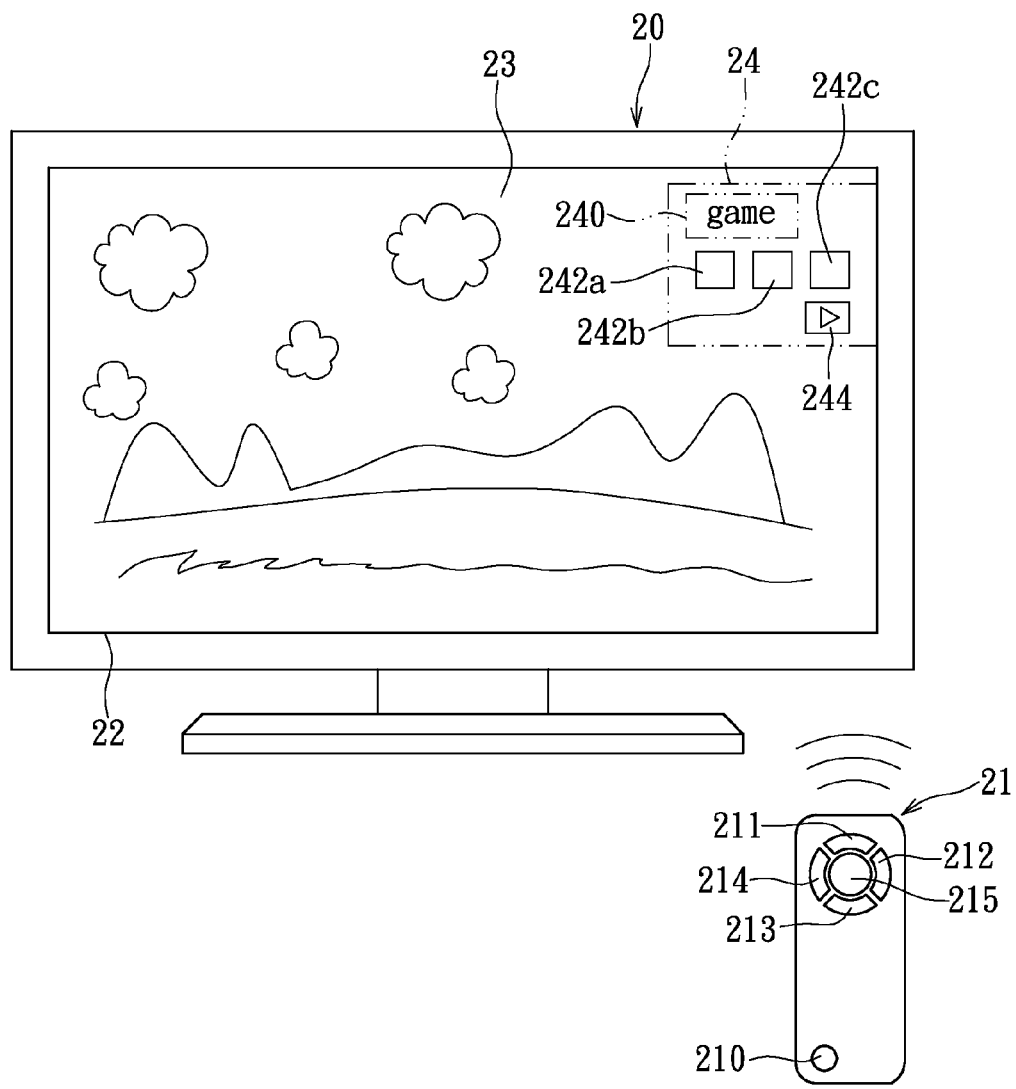
FIG. 4 shows a diagram of an electronic device which shows an application list according to an embodiment of the present disclosure.

In the digital television 20 shown in FIG. 4, the user interface 23 includes the index region 24 arranged at side of the user interface 23. For example, the index region 24 shown in FIG. 4 locates at the right side of the user interface 23, and occupies one quarter of the width of the user interface 23, for avoiding the interference and blocking of other contents on the user interface 23. When the digital television 20 receives the control commands at the time the applications are hidden, the categorized application list may be depicted by the graphics processing unit 104 according to the assignment from the processing unit 101, and the applications of the same category may be shown in the index region 24.

The categorized application list has the several applications stored by the electronic device, and each application is categorized according to the associating category, the applications associating with the same category may be collected into the same group. After the digital television 20 is turned on, the processing unit 101 may integrate all of the category names 240 of the categories stored in the digital television 20 and the icons 242 of each application within the categories, for generating the categorized application list. Thus, each group has one category name 240 of a category and the icons 242 of all of the applications in the category. Each icon 242 at the categorized application list may be horizontally ordered under the category name 240 which the icon 242 belongs to, as shown in FIG. 4. When the categorized application list is changed from hiding status to display status according to the control command, the processing unit 101 may select the contents of one of the categories, and display it from the edge of the user interface 23 and moving it gradually toward the middle of the user interface 23 until it is located in the index region 24, which shows the effect that the icon 242 of the application is pulled out from the side of the user interface 23. Thus, after the user presses the control button 210 of the television remote controller 21, we may see several icons 242 representing the applications to be opened up from the side to the middle of the screen 22. Take the category in FIG. 4 as an example, according to the shown category name 240 "game", we may know that the applications represented by the icons 242a to 242c at the index region 24 is the programs related to games.

Figure 5:
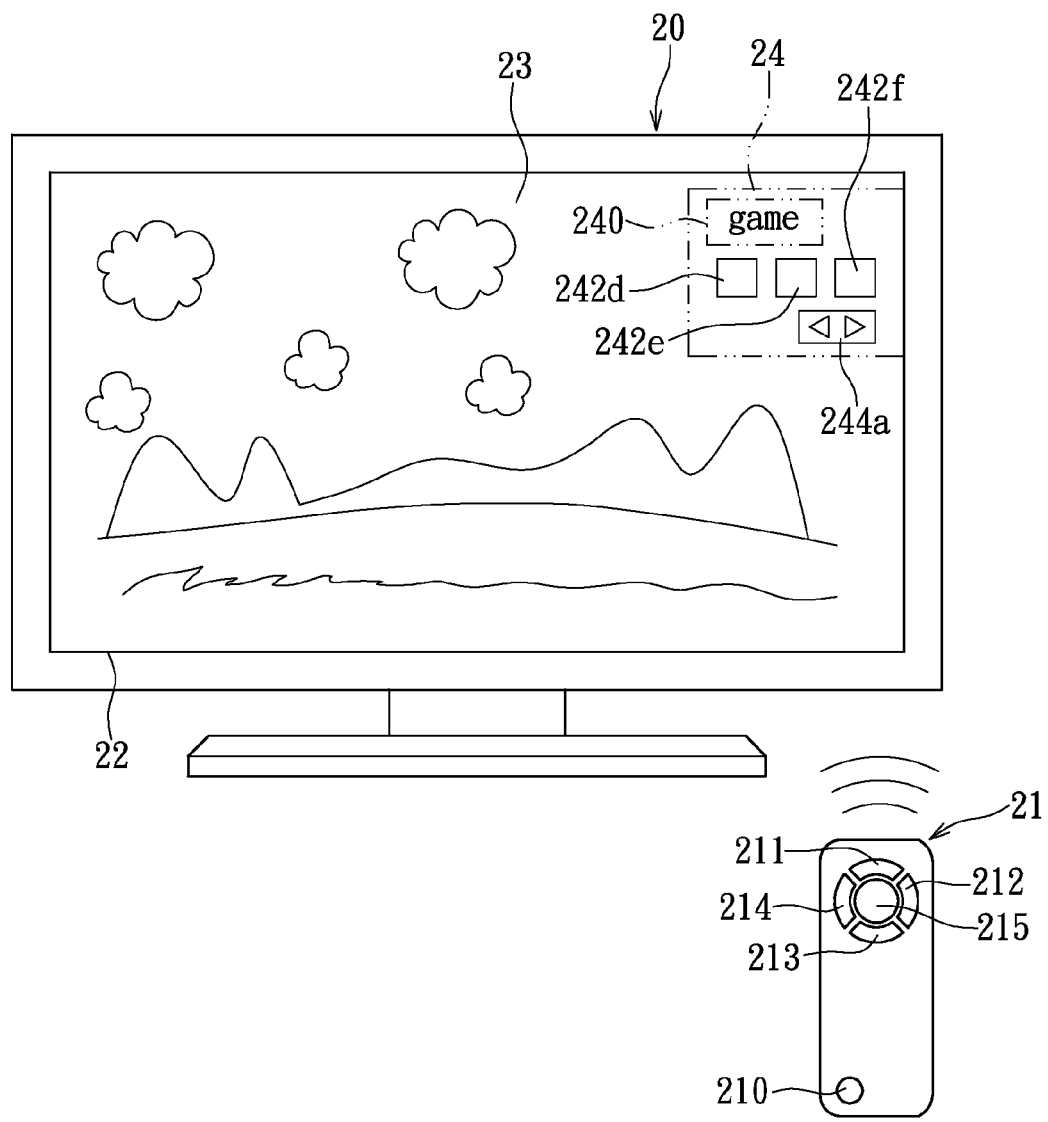
FIG. 5 shows another diagram of an electronic device which shows an application list according to an embodiment of the present disclosure.

More specifically, because the index region 24 does not cover the whole user interface 23, thus the number of icons 242 shown in index region 24 may be limited. When the number of applications in the selected category exceeds the number (which is the first display number) of icons 242 can be contained in the index region 24, the processing unit 101 may select the icons of part of the applications according to the first display number, and sends the selected icons to the graphics processing unit 104 for depicting and outputting. At the moment, the processing unit 101 may further generate the switch button 244 which is depicted by the graphics processing unit 104 at the index region 24, for example, showing the "next page" button or direction button for page changing under the icons. The user may use the direction button of the television remote controller 21 (as the right button 212 shown in FIG. 3) for selecting the switch button 244, and generates the page changing command according to the confirmation by using the selection button 215. After the command receiving unit 103 receives and sends the page changing command to the processing unit 101, the processing unit 101 then selects the icons of another part of the applications which are not shown before according to the first display number, and the icons are also shown horizontally within the index region 24, as the icons 242d to 242f representing the three different applications in the index region 24 of FIG. 5.

If the category still has the icons related to the applications, the processing unit 101 may still generate the switch button 244a (such as the "previous page" and "next page" buttons in FIG. 5), for allowing the user to select and switch, thus making every icon of the applications is able to be shown at the index region 24.

Please refer back to FIG. 4 again. The user may select one of the icons (for example, the icon 242a) by using the button of the television remote controller 21 when checking the icons 242a to 242c of the applications of specific category at the index region 24, for generating a selection command to the digital television 20. The processing unit 101 may read the application associated with the selected icon 242a from the storage unit 102 according to the selection command inputted from the television remote controller 21, and may activate and execute the application.

From another aspect, the index region 24 just shows the information of one category at a time. If the user needs to check or find the applications which is categorized in another category, he or she may operates the specific buttons or button sets of the television remote controller 21 for generating the group changing command, for notifying the processing unit 101 to change the category name and the icons representing the applications which are shown in the index region 24. The processing unit 101 reads the data of another category (such as finance and economy) from the several categories of the categorized application list according to the categorized changing command, and controls the graphics processing unit 104 for depicting the category name and icons of the applications of the newly read category at the index region 24. Thus, the user may check the icons of the applications related to the finance and economy at the index region 24 of the user interface 23.

Every time when the processing unit 101 receives the group changing command, it may switch the category data according to the category order in the categorized application list, or switch the category data in a loop according to the storage order of the categories in the storage unit 102, or switch the data according to the order defined by the user.

Another Device Embodiment

Figure 6:
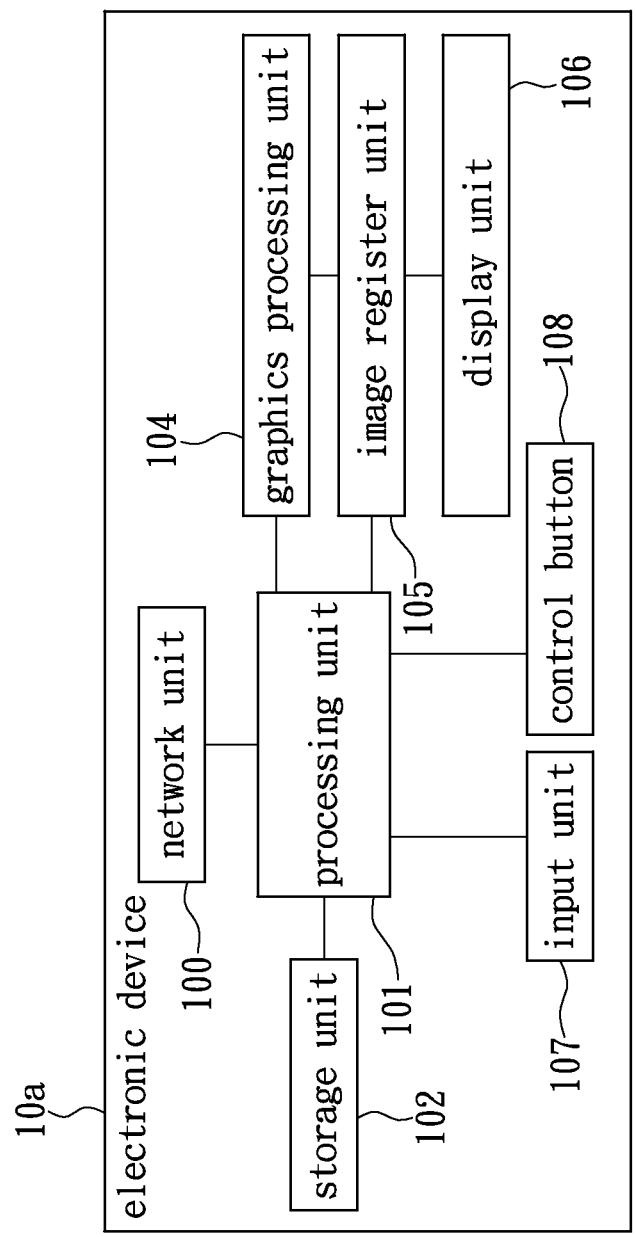
FIG. 6 shows a block diagram of an electronic device according to another embodiment of the present disclosure.

Please refer to FIG. 6 which shows a block diagram of an electronic device according to another embodiment of the present disclosure.

Comparing with the block diagram of the electronic device 10 shown by FIG. 2, the electronic device 10a of this embodiment further includes an input unit 107 and a control button 108 for replacing the command receiving unit 103 in FIG. 2. The electronic device 10a may be a tablet computer or a smart phone. The input unit 107 may be a touch screen of the electronic device 10a, and the control button 108 for generating the control commands to the processing unit 101 may be the buttons disposed on the tablet computer or the smart phone.

Figure 7:
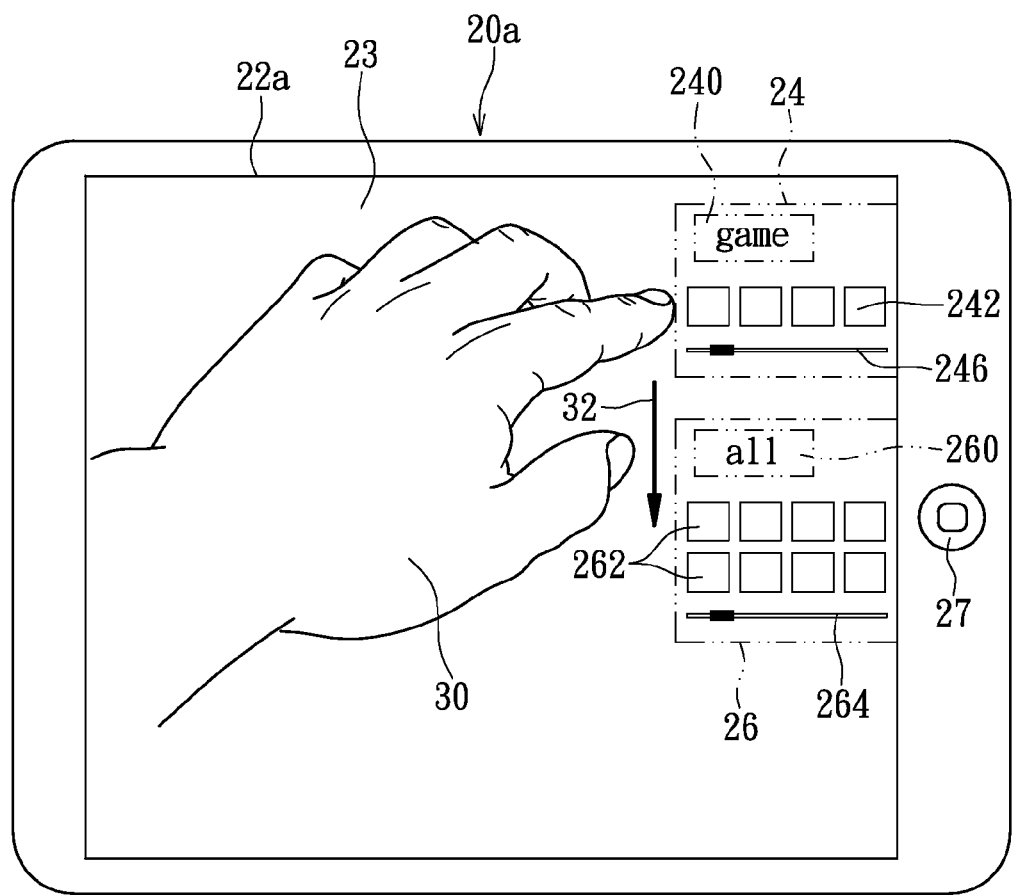
FIG. 7 shows a diagram of an electronic device which shows an application list according to another embodiment of the present disclosure.

Please refer to FIG. 7 which shows an electronic device according to this embodiment. The electronic device is implemented by a tablet computer 20a which has a touch screen 22a and a control button 27 disposed at the surface of the tablet computer 20a. The processing unit (refer to 101 in FIG. 6) controls the graphics processing unit (refer to 104 in FIG. 6) for depicting and showing the user interface 23 on the touch screen 22a. At the user interface 23 of this embodiment, in addition to the index region 24 for displaying the categorized application list, there may further have a list region 26 for displaying all lists of the applications in the electronic device. The list region 26 is for accommodating second display number of icons. Take FIG. 7 as an example, the list region 26 may be used to display 8 icons representing the applications.

The application list includes the list name 260 (such as the "all" in this embodiment) and the icons 262 of all applications stored in the tablet computer 20a. The icons 262 may be horizontally arranged in one or more arrays, as shown in FIG. 7 which has two arrays of icons 262. When the tablet computer 20a receives the control command generated by pressing the control button 27, the originally hidden categorized application list and application list may be respectively outputted to the index region 24 and the list region 26 for being displayed, as shown in FIG. 7.

Because the number of the applications stored in the tablet computer 20a may exceed the second display number of the list region 26. When the application list is outputted to the list region 26 for being displayed, because the list region 26 may only include the icons 262 of a part of all applications, there may be a scroll bar 264 at the bottom of the list region 26 for assigning the number of the remaining icons. Similarly, in the index region 14, if the number of the applications in the displayed category exceeds the first display number of the index region 24, there may also be a scroll bar 246 for assigning same kinds of other remaining icons of the applications.

The touch screen 22a of this embodiment may be used as the input unit 107 for receiving the operations of the user and for generating input command to the processing unit 101. Thus, the user may horizontally slide at the list region 26 of the user interface by using the touch screen 22a for generating a page changing command. The processing unit 101 may output the icons of other applications according to the page changing command, the second display number of the list region 26, and the direction of the sliding operation of the user. Similarly, the user may generate page changing command at the index region 24 by sliding operation, and the processing unit 101 may output the icons of other applications of the category according to the first display number of the index region 24 and the sliding operation of the user.

The categorized application list displayed at the index region 24 may include the category names of several categories and the objects (which is the icons of the applications in this embodiment) representing each of the applications in the categories. When the processing unit 101 executes the list arrangement program after being turned on, all of the categories and the applications under each category may be arranged for combining into a list interface. Please refer to the diagram of the categorized application list shown in FIG. 8.

The categorized application list 40 uses the categories of the electronic device as the accordance of categorization, and the category name 400 of each category and the objects 402 (such as icons) of applications associating with the category are independent group 404, and the adjustment of the objects 402 of one group 404 does not interfere the objects 402 of another group 404. Thus, when one of the category name 400 and objects 402 of one group is displayed at the index region 24 (such as the category name 400a and the objects 402a of the group 404a) and the processing unit 101 adjusts the displayed objects 402a of the group 404a according to the page changing command, the objects 402b and 402c of other groups (such as the groups 404b and 404c) are not moved along with the objects 402a, which decreases the processing operations of the processing unit 101 and the graphics processing unit 104 and reduces the confusion of the user.

However, when the processing unit 101 receives the group changing command, the operations may be executed at a whole group 404. As shown in FIG. 7, the user may press the category name 240 or slides downward on the index region 24 by using a finger 30 for generating the group changing command. Back to the diagram of FIG. 8, if the displayed components at the index region 24 are the category name 400b and several objects 402b of the group 404b, the processing unit 101 may switch and output the category name 400a and several objects 402a of the group 404a at the index region 24 of the user interface 23 according to the group changing command generated by the downward sliding operation 32 of the user.

Figure 8:
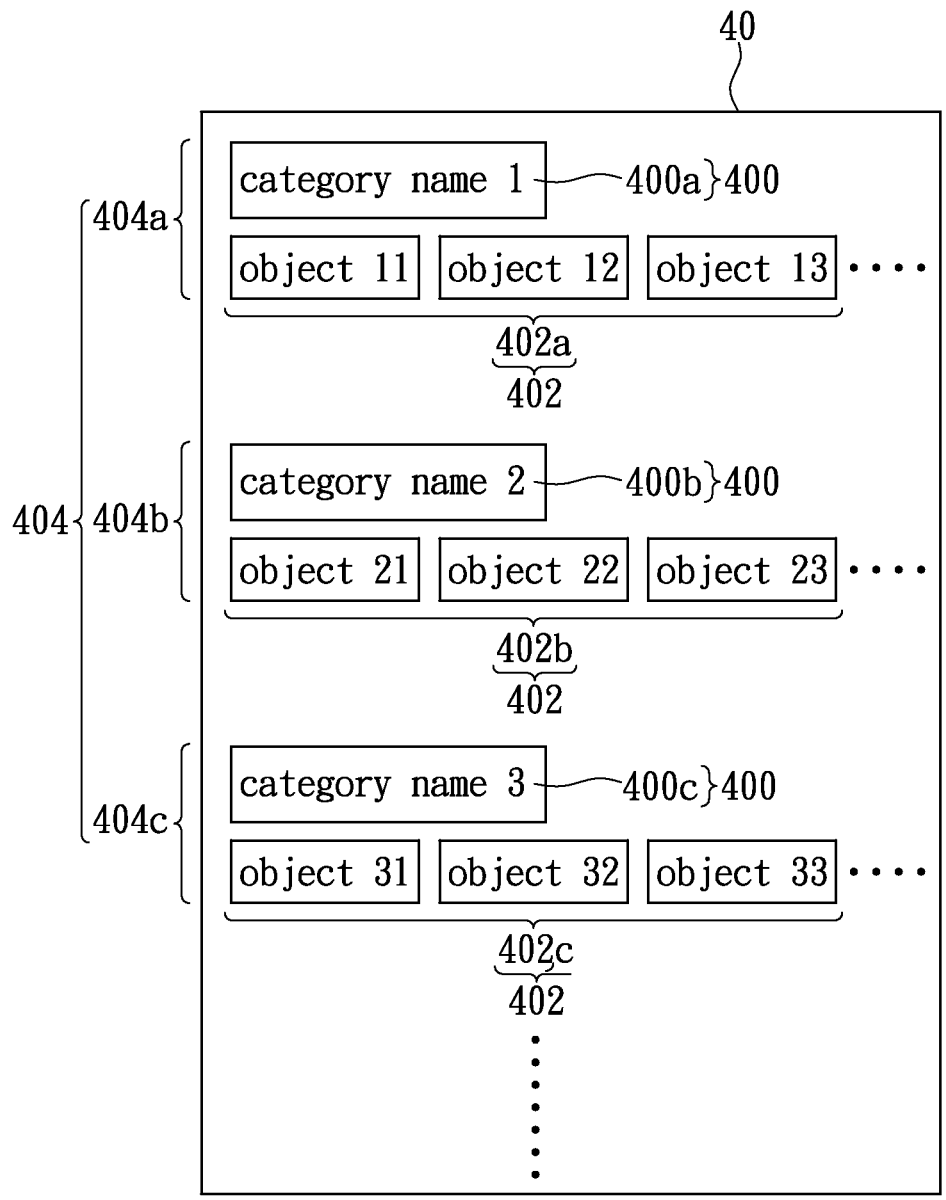
FIG. 8 shows a diagram of a categorized application list according to the present disclosure.

It's worth noting that the categorized application list 40 in FIG. 8 is just for explaining the list structure of the processing unit 101 after reading and integrating the data. Practically, the processing unit 101 may assign the graphics processing unit 10 to depict the data which may be shown in the index region 24 after receiving the control command and the group changing command for displaying the data of one of the groups 404.

The user may also generate a selection command by pressing or clicking the icons at the index region 24 or the list region 26, for activating the applications corresponding to the selected icons. In addition, if the user needs to re-categorize one of the applications, he or she may generate a category changing command by continuously pressing one of the icons displayed at the index region 24 or the list region 26 for making the processing unit 101 open a category list according to the continuous pressing operation, to allow the user to select different categories from the category list. The processing unit 101 may associate the application with the selected category according to the selection of the user, and de-associates the application with the original category.

Another exemplary embodiment for changing the category of the application may be selecting and dragging the icon of the application from the list region 26 to the index region 24. The processing unit 101 may categorize the application which is correspondence to the dragged icon 262 to be under the category associated with the icon 242. For example, the original "no category" application may be moved to the "game" category, for generating new relations between the application and the category.

For reducing the influence when the user is executing other operations or surfing at the user interface 23, if the processing unit 101 does not receive any command for operating the program list and the application list or the control command generated by the control button 27 pressed by the user during a predetermined time, the data displayed at the index region 24 and the list region 26 may be restored to hiding status, which make the user be able to watch the whole video or image contents on the user interface 23.

The rest part of this embodiment which is the same as FIGS. 2 to 5 is not repeatedly described.

Method Embodiment

The following shows a method for presenting application list of an electronic device, which includes the categorization of the applications, the presenting manner of the application according to the categorization, and the manner for changing the category of the application.

Figure 9:
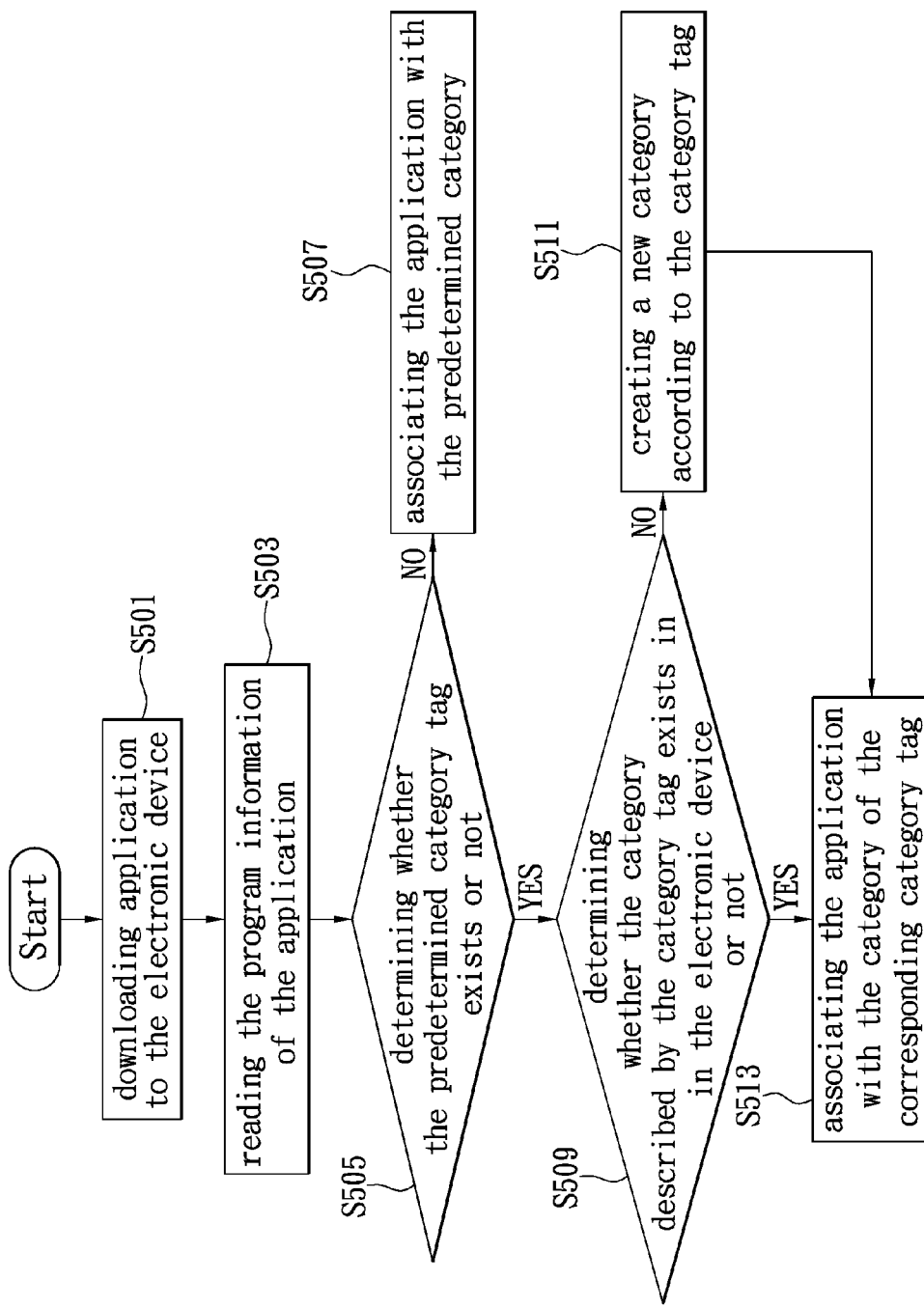
FIG. 9 shows a flow chart for associating an application with a category according to an embodiment of the present disclosure.

First, please refer to FIG. 9 which shows the flow chart for categorizing applications according to an embodiment, and please also refer to the block diagram of the electronic device shown in FIG. 2.

The processing unit 101 of the electronic device 10 connects to the Internet through the network unit 100, and downloads the applications from the server to the storage unit 102 of the electronic device 10 (S501). During the processes for storing the applications, the processing unit 101 further reads the program information of the applications (S503), such as the meta data thereof, and determines whether a category tag for explaining the properties of the applications is included within the program information or not (S505).

If the program information does not have the category tag, the processing unit 101 may associate the application with a predetermined category recorded in the storage unit 102, such as "no category" or "other" categories (S507). On the other hand, if the program information has the category tag, the processing unit 101 may prepare to categorize the applications according to the category tag. The processing unit 101 may determine whether the storage unit 102 stores the same or similar categories or not according to the category tag (S509). If the storage unit 102 does not have the same or similar category, the processing unit 101 may create a new category according to the category tag (S511), and then builds the relations between the application and the category corresponding to the category tag (S513). That is, the application is categorized to be under the new category. If the processing unit 101 finds the same or similar category stored in the storage unit 102 in the step S509, the application may be directly associated with the corresponding category, which makes the application be categorized under the category corresponding to the category tag (S513).

Thus, every time when the electronic device 10 downloads a new application, the application may automatically be categorized, for collecting the applications with the same properties, usage, and functions into the same category, which makes the user be easy to find applications according to the categories.

Figure 10:
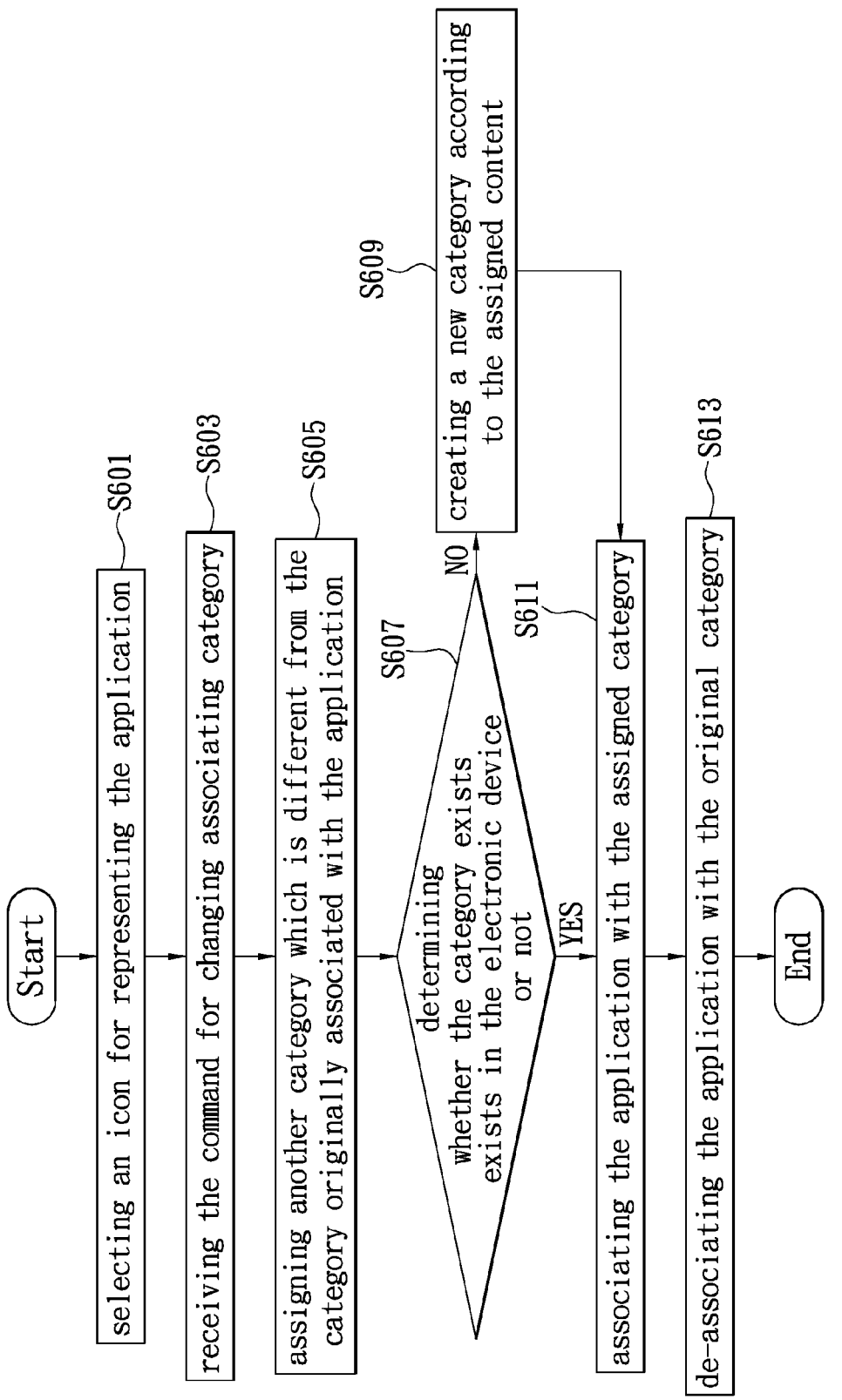
FIG. 10 shows a flow chart for changing the associated category of an application according to an embodiment of the present disclosure.

In addition to the auto-categorization of the applications, the user may also change the associated category of the applications according to the preference or using habit, or re-associates the "no category" or "other" applications to the proper categories. One of the manners for changing the associated category of the application may be shown in the flow chart in FIG. 10.

According to the command sent to the command receiving unit 103 by the user through the remote controller 11 (please refer to FIG. 2), or the icon representing an application selected on the user interface by using the input unit 107 (please refer to FIG. 6), the processing unit 101 may identify the selected application at the user interface (S601), and then receives the category changing command for changing the associated category transmitted from the command receiving unit 103 or the input unit 107 (S603). For example, the command may be generated by pressing the button or the combination of buttons on the remote controller 11, or continuously pressing the icon of the application on the touch screen.

After the user operates the remote controller 11 or the input unit 107 for generating the category changing command, he or she may further assign another category being different from the category which is originally associated by the application, for changing the corresponding category associated by the selected application (S605). For example, the processing unit 101 may open a category list after receiving the command, for allowing the user to select a specific category name from the category list. Alternatively, the processing unit 101 may receive the operation that the user drags the selected application to the category which is presently displayed on the user interface, and then the application may be listed with other icons under the same category. Moreover, the user interface may provide an input column for allowing the user to input the category name willing to be associated.

The processing unit 101 determines whether the category assigned by the user exists in the storage unit 102 of the electronic device 10 or not (S607). If the category assigned by the user is not stored in the storage unit 102, the processing unit 101 may create and store a new category in the storage unit 102 according to the input of the user (S609). Then the processing unit 101 may assign the selected application to the category for creating the relation according to the assigned category (S611). That is, the category tag of the application may be associated with the assigned category. On the other hand, if the determination in step S607 shows that there exists the assigned category in the storage unit 102, the application may be directly categorized to the assigned category, for creating the relation between the application and the assigned category (S611).

At last, the processing unit 101 may further remove the application from the originally associated category (S613), which is, de-associating the application with the originally associated category.

Thus, the user may change the category of the application which is associated automatically by the electronic device 10. For example, the applications which are originally associated with the "no category" and "other" categories may be re-categorized to the proper category, for the searching and surfing of the user.

Figure 11:
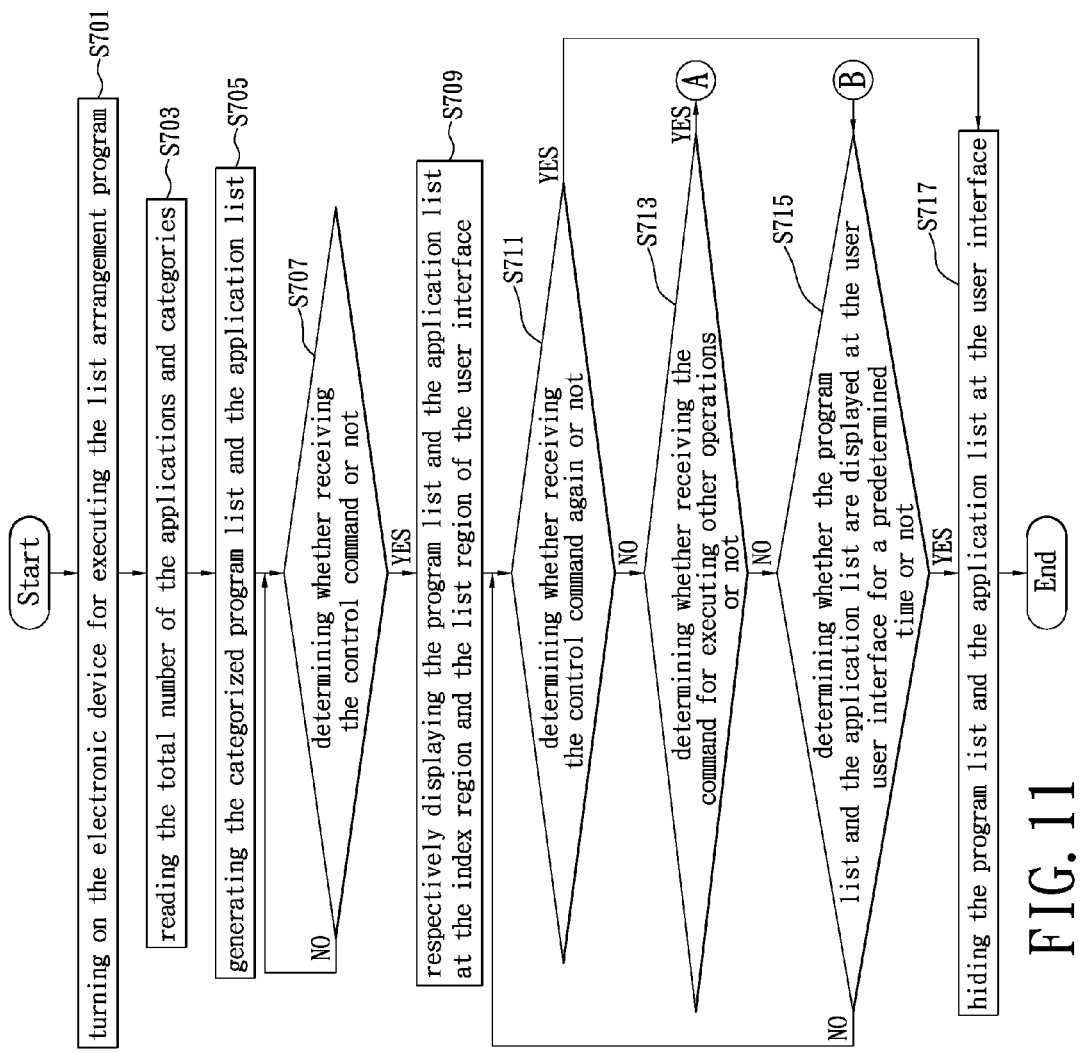
FIG. 11 shows a flow chart of a method for presenting application list according to an embodiment of the present disclosure.

After the applications are categorized to proper categories through the steps in FIGS. 9 and/or 10, the present disclosure further provides a method for presenting application lists, and the steps of the method are as shown in FIG. 11. By using the method, a list interface which categorizes, preserves, and clearly presents all of the applications according to categories may be provided, which increases the convenience of searching and selecting applications. For further explanation, please refer to FIG. 6 which shows a block diagram of an electronic device according to an embodiment.

When the electronic device 10*a* is turned on, the processing unit 101 may read and execute the list arrangement program from the storage unit 102 (S701). The processing unit 101 may read the number of all applications and the categories associated by all applications stored in the electronic device 10*a* according to the list arrangement program (S703), for generating the application list according to each of the applications, and for generating the categorized application list according to each of the categories, to display at the user interface of the electronic device 10a (S705). Please refer to the diagram shown in FIG. 8 as the categorized application list.

After the application list and the categorized application list are prepared, the processing unit 101 may determine whether receives the control command or not (S707). If the control command is received, that means the user assigning the requirement of displaying the application list and the categorized application list, and the processing unit 101 may assign the graphics processing unit 104 to depict the application list and the categorized application list respectively at the list region (please see 26 in FIG. 7) and the index region (please see 24 in FIG. 7) according to the arrangement locations at the user interface (S709). If the processing unit 101 does not receive the control command (that is, the determination result in step S707 is negative), the application list and the categorized application list remain the hiding status, and the processing unit 101 continuously waits the input of the control command.

After the application list and the categorized application list are displayed at the respective regions of the user interface, the processing unit 101 may determine whether receives the control command again or not (S711). If the control command is received when the index region and the list region are respectively displaying categorized application list and the application list, the categorized application list and the application list are hidden again (S717). If the processing unit 101 does not receive the control command again, it may continuously determine whether receives the commands of other kinds of operations executing on the categorized application list or the application list or not (S713). If the processing unit 101 does not receive other kinds of commands either, it may determine whether the time of displaying the categorized application list and the application list on the user interface reaches a predetermined time or not (S715).

If the processing unit 101 does not receive any command for controlling the applications shown at the above regions and the predetermined time is not reached (that is, the result of step S715 is negative), the program list and the application list are still displayed at the user interface, and the processing unit 101 may continuously execute the determinations after the step S711. When the predetermined time is reached (that is, the result of step S715 is positive), the application list originally displayed at the list region and the categorized application list originally displayed at the index region may be hidden (S717), which makes the user interface only show the screens of playing video program or opened applications.

Figure 12:
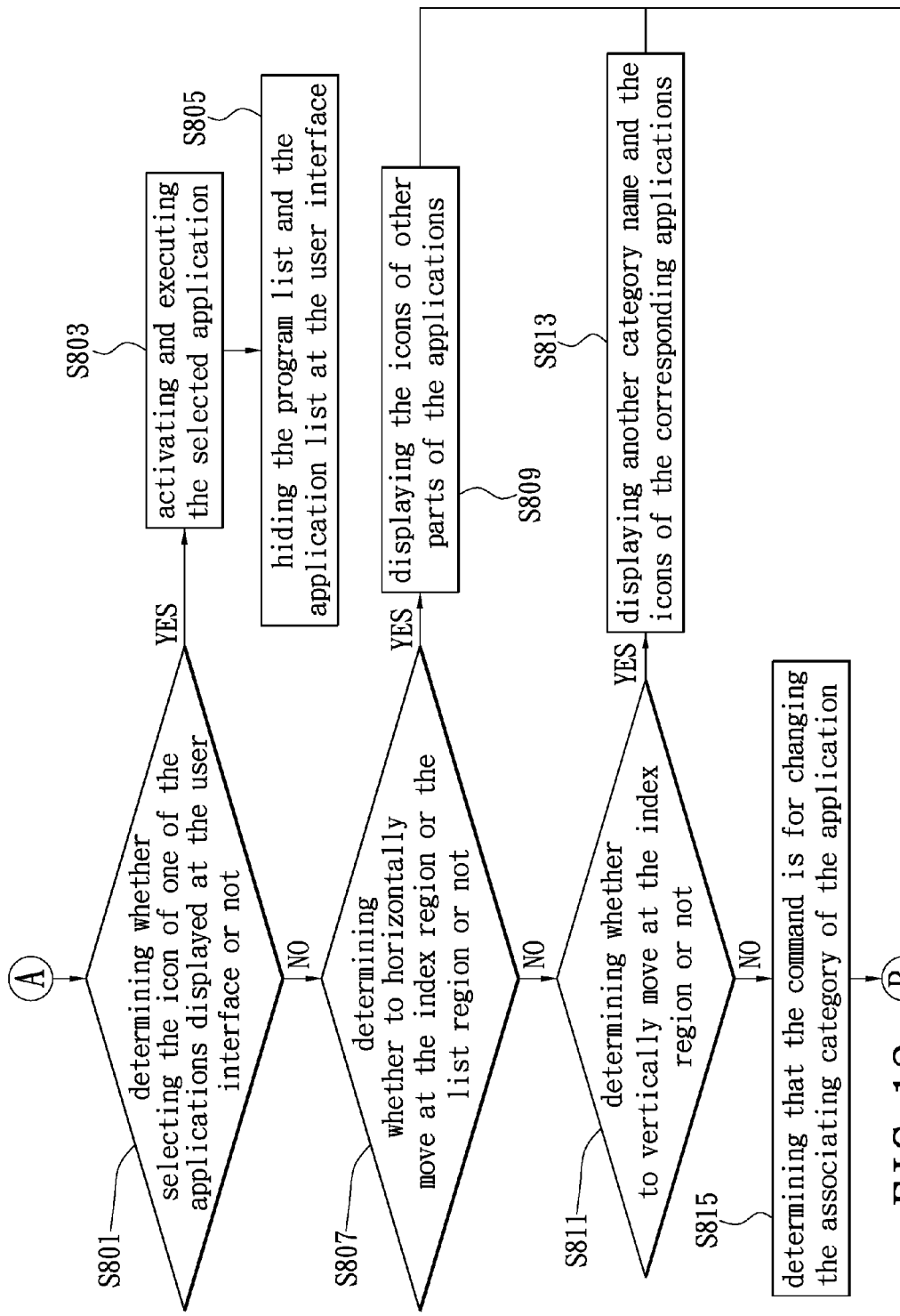
FIG. 12 shows a flow chart for controlling the application list according to an embodiment of the present disclosure.

It's worth noting that if the step S713 determines that the processing unit 101 receives other kinds of commands, the following determinations and processing procedures are shown in the flow chart presented by FIG. 12.

When the processing unit 101 determines that the command for controlling the applications displayed at the index region or the list region is received, it may further determine whether the command is the selection command generated by selecting the icon of one of the applications or not (S801). If the selection command is received, the processing unit 101 may activate and execute the selected application (S803), and respectively hides the application list displayed at the list region and the categorized application list displayed at the index region (S805). Thus, the user may operate the selected application in step S801 on the whole user interface.

If the received command is not the selection command, the processing unit 101 may further determine whether the command is the page changing command generated by horizontally moving at the index region or the list region or not (S807). If the page changing command is received at the index region, the processing unit 101 may select the icons of the applications which are not displayed from the category presently displayed at the index region according to the first display number of the index region, for replacing the icons of the applications which are originally displayed at the index region. If the page changing command is received at the list region, the processing unit 101 may select the icons of the applications which are not displayed from the application list according to the second display number of the list region, for replacing the icons of the applications which are originally displayed at the list region (S809).

If the processing unit 101 does not receive the page changing command either, it may further determine whether receives the group changing command generated by vertically moving on the index region (S811). If the group changing command is received, the processing unit 101 then selects another category according to the categorized application list, displays the category name included by the selected category at the index region, and selects icons of the applications under the selected category according to the first display number (S813).

If the command received by the processing unit 101 is not the selection command, the page changing command, or the group changing command, the processing unit 101 may determine that the command generated by the user toward the application list or the categorized application list is the category changing command for changing the associating category of the applications (S815). The detail contents of changing the associated category of the application are described in the flow chart shown by FIG. 10.

After the processing unit 101 completes the corresponding operations according to the received page changing command, group changing command, or category changing command, it may still determine whether the display times of the categorized application list and the application list reach a predetermined time or not (corresponding to the step S715 in FIG. 11), and hides the application list and the program list according to the determination result (the step S717 in FIG. 11) or continuously waits for the command inputted by the user through the input unit 107 or the command received by the command receiving unit.

It's worth noting that FIG. 12 the order of the determinations shown in FIG. 12 is just an example, which does not practically restrict the order of the commands received by the processing unit 101. In addition, although the flow charts in FIGS. 11 and 12 is described along with the block diagram of the electronic device shown in FIG. 6, the steps may also be applied to the block diagram of the electronic device shown in FIG. 2 for achieving the same efficacies.

Possible Efficacies of the Embodiments

According to the embodiment of the present disclosure, the electronic device and the method for presenting application lists may categorized the applications under several categories according to the predetermined properties or the usage habit of the user, for eliminating the confusions caused by the numerous number of icons of the applications which are displayed without any order. And the horizontally arrayed and displayed applications under the same category may also improve the problem of long accessing time of the application caused by too many stages and selections. When displaying the icons of the applications, the present disclosure may also provide the sliding or rotating manners for switching different categories and display pages, for achieving the purposes of accommodating all of the applications at limited display regions and reducing the covering of other contents on the user interface.

Moreover, according to the categorized application list provided by the present disclosure, when an object representing an application in a group is changed at the index region according to the page changing command, the objects in other groups may not be influenced. That is, each group in categorized application list is independent to one another. Thus, when the processing unit and the graphics processing unit executes the operations of page changing according to the page changing command, the processing amounts may be greatly decreased. And when the index region is designed to be able to accommodating two or more groups of applications, the user confusion caused by operating the system may be avoided.

In addition, according to the method and the electronic device described by the present disclosure, the user may re-categorize the applications to different categories according to the actual needs, for easier usage experiences.

Some modifications of these examples, as well as other possibilities will, on reading or having read this description, or having comprehended these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. A method for presenting application lists, which is associated with an electronic device and the electronic device is controlled by a remote controller, comprising:
    activating a list arrangement program;
    reading a plurality of applications according to the list arrangement program, and generating a categorized application list according to the applications, wherein each application is associated with one of a plurality of categories and includes an object representing the application, and the categorized application list includes a plurality of groups; each group includes a category name of one of the categories and is associated with the object of the one or more applications of the category; and
    receiving a control command for displaying one of the groups at an index region of a user interface of the electronic device;
    wherein after reading the applications, generating an application list including all of the objects representing the applications and displaying the application list at a list region of the user interface according to the control command;
    wherein the index region and the list region are arranged at a side of the user interface and the list region is below the index region;
    wherein displaying one of the groups at the index region further includes:
        when a first display number of the index region for displaying the objects is smaller than a number of the objects included by the group, the index region displays a part of the objects of the category according to the first display number;
    wherein displaying the application list at the list region further includes:
        when a second display number of the list region for displaying the objects is smaller than a number of the objects of the application list, the list region displays a part of the objects of the application list according to the second display number, and when the list region displays the part of the objects, receiving a page changing command corresponding to the application list, for displaying other objects of the application list according to the second display number;
    wherein one of the groups at the index region and the application list at the list region are displayed simultaneously; and
    wherein after displaying one of the groups at the index region and the application list at the list region, further comprises:
        when no command being received after time counting reaches a predetermined time, hiding the group displayed at the index region and the application list at the list region;
    wherein after displaying the application list at the list region, further includes:
        dragging one of the objects displayed at the list region to the index region for generating a category changing command, to change the associated category of the application represented by the dragged object;
        associating the application represented by the dragged object with the category corresponding to the group displayed at the index region; and
        de-associating the application represented by the dragged object with the category originally associated;
    wherein before activating the list arrangement program, further includes:
        downloading the application;
        determining whether a program information of the application has a category tag or not; and
        when the program information of the application has the category tag, associating the application with one of the categories according to the category tag, wherein the object is an icon representing the application;
        when the program information of the application does not have the category tag, associating the application with a predetermined category of the category.

2. The method for presenting application lists according to claim 1, wherein after the index region displays one of the groups, further comprises:
    receiving a selection command for selecting one of the objects displayed at the index region;
    activating the application which is represented by the selected object; and
    hiding the group displayed at the index region.

3. The method for presenting application lists according to claim 1, wherein after displaying one of the groups at the index region, further comprises:
    receiving a page changing command for displaying other objects of the group according to the first display number.

4. The method for presenting application lists according to claim 1, wherein after displaying one of the groups at the index region, further comprises:
    receiving a group changing command for switching to another group of the categorized application list, wherein the groups of the categorized application list are switched and displayed in a loop according to the group changing command.

5. The method for presenting application lists according to claim 4, wherein receiving the group changing command for switching the group further includes:
the group displayed by the index region moving vertically according to the group changing command.

6. The method for presenting application lists according to claim 1, wherein after displaying one of the groups at the index region, further comprises:
when receiving the control command again, hiding the group displayed at the index region.

7. The method for presenting application lists according to claim 1, wherein after displaying one of the groups at the index region, further includes:
selecting one of the objects displayed at the index region for generating a category changing command, to change the associated category of the application represented by the selected object;
displaying a category list and receiving one category assigned from the category list;
associating the application to the assigned category; and
de-associating the application with the category originally associated.

8. The method for presenting application lists according to claim 7, wherein receiving the category assigned from the category list further includes:
creating the category assigned from the category list, for associating the application to the created category.

9. The method for presenting application lists according to claim 1, wherein receiving the page changing command for switching the objects further includes:
the object horizontally moving from the side of the user interface to middle of the user interface according to the page changing command.

10. An electronic device, comprising:
a display unit for displaying a user interface of the electronic device;
a storage unit for storing a plurality of applications and a plurality of categories; and
a processing unit for controlling by a remote controller and executing the following steps:
receiving a control command for activating a list arrangement program;
executing the list arrangement program for reading the applications, and generating a categorized application list according to the applications, wherein each application is associated with one of the categories and has an object representing the application, and the categorized application list includes a plurality of groups; each group includes a category name of one of the categories and is associated with the object of the one or more applications of the category; and
receiving a control command for displaying one of the groups of the categorized application list at an index region of the user interface, wherein the index region displays the category name of the group and the objects of the applications which are horizontally listed;
wherein the processing unit further executes the list arrangement program for generating an application list; the application list includes all of the objects of the applications stored in the storage unit, and displays the objects of the application list at a list region of the user interface according to the control command, wherein the index region and the list region are arranged at a side of the user interface and the list region is below the index region;
wherein displaying one of the groups at the index region further includes:
when a first display number of the index region for displaying the objects is smaller than a number of the objects included by the group, the index region displays a part of the objects of the category according to the first display number;
wherein displaying the application list at the list region further includes:
when a second display number of the list region for displaying the objects is smaller than a number of the objects of the application list, the list region displays a part of the objects of the application list according to the second display number, and when the list region displays the part of the objects, receiving a page changing command corresponding to the application list, for displaying other objects of the application list according to the second display number;
wherein one of the groups at the index region and the application list at the list region are displayed simultaneously;
wherein when time counting of the processing unit reaches a predetermined time without receiving any command, the processing unit hides the group displayed at the index region and the application list at the list region;
wherein after displaying the application list at the list region, further includes:
dragging one of the objects displayed at the list region to the index region for generating a category changing command, to change the associated category of the application represented by the dragged object;
associating the application represented by the dragged object with the category corresponding to the group displayed at the index region; and
de-associating the application represented by the dragged object with the category originally associated;
wherein before activating the list arrangement program, further includes:
downloading the application;
determining whether a program information of the application has a category tag or not; and
when the program information of the application has the category tag, associating the application with one of the categories according to the category tag, wherein the object is an icon representing the application;
when the program information of the application does not have the category tag, associating the application with a predetermined category of the category.

11. The electronic device according to claim 10, wherein the processing unit receives a selection command for selecting one of the objects displayed at the index region, activates the application represented by the object according to the selection command, and hides the group displayed by the index region.

12. The electronic device according to claim 10, wherein the processing unit receives a group changing command for switching the group displayed at the index region, wherein the groups of the categorized application list are switched displayed in a loop according to the group changing command.

13. The electronic device according to claim 10, wherein the widths of the index region and the list region are a quarter of a width of the user interface, respectively.

14. A non-transitory computer-readable recording medium which records a set of computer executable program, when the computer executable program is read by a processor, the processor executes the computer executable program for implementing a method for presenting application lists, which is associated with an electronic device and the electronic device is controlled by a remote controller, comprising:

activating a list arrangement program;

reading a plurality of applications according to the list arrangement program, and generating a categorized application list according to the applications, wherein each application is associated with one of a plurality of categories and includes an object representing the application, and the categorized application list includes a plurality of groups; each group includes a category name of one of the categories and is associated with the object of the one or more applications of the category; and receiving a control command for displaying one of the groups at an index region of a user interface of the electronic device;

wherein after reading the applications, generating an application list including all of the objects representing the applications and displaying the application list at a list region of the user interface according to the control command;

wherein the index region and the list region are arranged at a side of the user interface and the list region is below the index region;

wherein displaying one of the groups at the index region further includes:

when a first display number of the index region for displaying the objects is smaller than a number of the objects included by the group, the index region displays a part of the objects of the category according to the first display number;

wherein displaying the application list at the list region further includes:

when a second display number of the list region for displaying the objects is smaller than a number of the objects of the application list, the list region displays a part of the objects of the application list according to the second display number, and when the list region displays the part of the objects, receiving a page changing command corresponding to the application list, for displaying other objects of the application list according to the second display number;

wherein one of the groups at the index region and the application list at the list region are displayed simultaneously; and wherein after displaying one of the groups at the index region and the application list at the list region, further comprises:

when no command being received after time counting reaches a predetermined time, hiding the group displayed at the index region and the application list at the list region;

wherein after displaying the application list at the list region, further includes:

dragging one of the objects displayed at the list region to the index region for generating a category changing command, to change the associated category of the application represented by the dragged object;

associating the application represented by the dragged object with the category corresponding to the group displayed at the index region; and de-associating the application represented by the dragged object with the category originally associated;

wherein before activating the list arrangement program, further includes:

downloading the application;

determining whether a program information of the application has a category tag or not; and when the program information of the application has the category tag, associating the application with one of the categories according to the category tag, wherein the object is an icon representing the application;

when the program information of the application does not have the category tag, associating the application with a predetermined category of the category.

* * * * *